(12) United States Patent
Shetty

(10) Patent No.: US 10,225,292 B2
(45) Date of Patent: Mar. 5, 2019

(54) SELECTIVELY PORTING MEETING OBJECTS

(71) Applicant: Adobe Systems Incorporated, San Jose, CA (US)

(72) Inventor: Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 884 days.

(21) Appl. No.: 14/523,541

(22) Filed: Oct. 24, 2014

(65) Prior Publication Data
US 2015/0046536 A1 Feb. 12, 2015

Related U.S. Application Data

(62) Division of application No. 11/263,582, filed on Oct. 31, 2005, now abandoned.

(51) Int. Cl.
| H04L 29/06 | (2006.01) |
| G06Q 10/10 | (2012.01) |
| H04L 12/18 | (2006.01) |

(52) U.S. Cl.
CPC ......... *H04L 65/403* (2013.01); *G06Q 10/109* (2013.01); *H04L 12/1827* (2013.01)

(58) Field of Classification Search
CPC .................................................. H04L 65/403
USPC ........................................................ 709/204
See application file for complete search history.

(56) References Cited

U.S. PATENT DOCUMENTS

| 5,057,996 A | * | 10/1991 | Cutler | G06F 9/4428 718/106 |
| 5,822,588 A | * | 10/1998 | Sterling | G06F 11/3632 714/E11.209 |
| 5,996,002 A | * | 11/1999 | Katsurabayashi | G06F 3/1454 709/204 |
| 6,088,729 A | * | 7/2000 | McCrory | H04L 29/06 709/217 |
| 6,147,695 A | * | 11/2000 | Bowen | G06T 3/40 345/503 |
| 6,185,602 B1 | * | 2/2001 | Bayrakeri | G06F 9/54 375/E7.003 |

(Continued)

OTHER PUBLICATIONS

Merriam-Webster, "processor", 2015.*
(Continued)

*Primary Examiner* — Ondrej C Vostal
(74) *Attorney, Agent, or Firm* — Kilpatrick Townsend & Stockton LLP

(57) ABSTRACT

Customizing an electronic meeting broadcast is described in which the meeting canvas is customized to the capabilities of the device of the participating user. The meeting server manages the electronic meeting including each of the participants' connections into the electronic collaboration space. As a part of the connection mechanism, the meeting server or a proxy/gateway connected to the meeting server has information on the capabilities of individual devices accessing the electronic meeting. Based on these capabilities and/or selections made by the meeting participant, the meeting server or proxy/gateway connected to the meeting server selectively identifies zero or more meeting objects from a collection of meeting objects supporting the meeting canvas of an electronic meeting and transmits only those meeting objects to the participant's device.

11 Claims, 5 Drawing Sheets

(56) References Cited

U.S. PATENT DOCUMENTS

| | | | | |
|---|---|---|---|---|
| 6,321,252 | B1* | 11/2001 | Bhola | H04N 7/15 348/E7.083 |
| 6,334,141 | B1* | 12/2001 | Varma | H04L 12/1813 709/201 |
| 6,917,984 | B1* | 7/2005 | Tan | H04L 29/06027 709/224 |
| 6,989,823 | B1* | 1/2006 | Lasneski | G09G 5/005 345/204 |
| 7,222,305 | B2* | 5/2007 | Teplov | G06F 3/1454 345/522 |
| 7,305,436 | B2* | 12/2007 | Willis | G06F 17/30702 707/999.007 |
| 7,313,593 | B1* | 12/2007 | Pulito | G06Q 10/10 370/260 |
| 7,734,802 | B1* | 6/2010 | Gay | G06F 3/0481 709/231 |
| 8,099,511 | B1* | 1/2012 | Ganesan | H04N 21/2225 709/231 |
| 8,458,125 | B1* | 6/2013 | Chong, Jr. | H04L 67/1008 707/610 |
| 2001/0037379 | A1* | 11/2001 | Livnat | G06F 21/6218 709/219 |
| 2002/0129052 | A1* | 9/2002 | Glazer | G06F 17/30038 715/202 |
| 2002/0133611 | A1* | 9/2002 | Gorsuch | H04L 12/1822 709/231 |
| 2003/0110218 | A1* | 6/2003 | Stanley | H04L 12/1813 709/204 |
| 2003/0164864 | A1* | 9/2003 | Aharon | G06T 17/00 345/474 |
| 2004/0181579 | A1* | 9/2004 | Huck | G06Q 10/10 709/205 |
| 2004/0181796 | A1* | 9/2004 | Fedotov | G06F 3/1454 719/323 |
| 2004/0215805 | A1* | 10/2004 | Tan | H04L 29/06027 709/231 |
| 2004/0225728 | A1* | 11/2004 | Huggins | H04L 29/06 709/223 |
| 2005/0091301 | A1* | 4/2005 | Oreizy | H04L 29/06027 709/200 |
| 2005/0108715 | A1* | 5/2005 | Kanai | G06F 9/4881 718/100 |
| 2005/0227218 | A1* | 10/2005 | Mehta | G09B 5/00 434/350 |
| 2005/0276234 | A1* | 12/2005 | Feng | H04L 12/1813 370/260 |
| 2006/0161620 | A1* | 7/2006 | Ganesan | G06Q 10/10 709/204 |
| 2006/0256117 | A1* | 11/2006 | Gegout | H04N 21/23412 345/473 |
| 2006/0256130 | A1* | 11/2006 | Gonzalez | G06F 17/3089 345/619 |
| 2014/0250173 | A1* | 9/2014 | Shetty | G06Q 10/109 709/204 |

OTHER PUBLICATIONS

ITU-T, "Series T: Terminals for Telematic Services", "Data protocols for multimedia conferencing", T.120, 2007.*

ITU-T, "Series X: Data Netwroks and Open System Communications OSI networking and system aspects—Abstract Syntax Notation One (ASN.1)", "Information technology—Abstract Syntax Notation One (ASN.1): Information object specification", X.681, 2002.*

ITU-T, "Series X: Data Netwroks and Open System Communications OSI networking and system aspects—Abstract Syntax Notation One (ASN.1)", "Information technology—ASN.1 encoding rules: Specification of Basic Encoding Rules (BER), Canonical Encoding Rules (CER) and Distinguished Encoding Rules (DER)", X.690, 2002.*

ITU-T, "Series T: Terminals for Telematic Services", "Multipoint communication service protocol specification", T.125, 1998.*

ITU-T, "Series T: Terminals for Telematic Services", "Multipoint communication service—Service definition", T.122, 1998.*

ITU-T, "Series T: Terminals for Telematic Services", "Network-specific data protocol stacks for multimedia conferencing", T.123, 2007.*

* cited by examiner

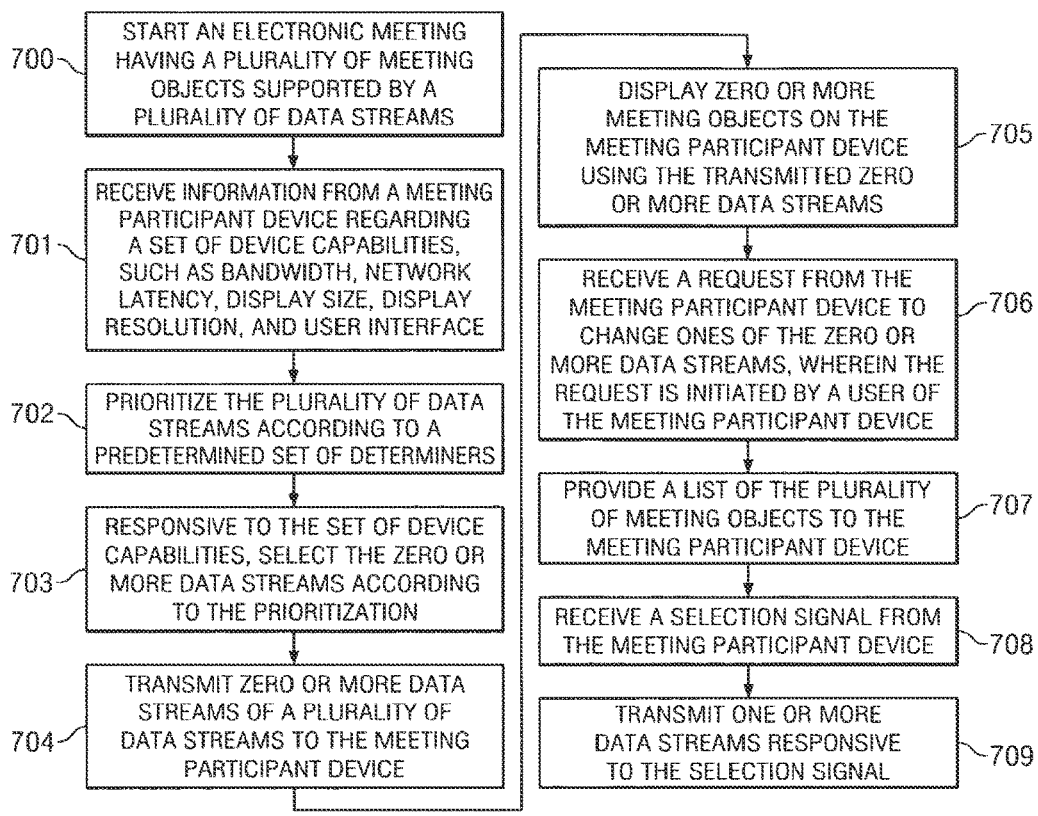
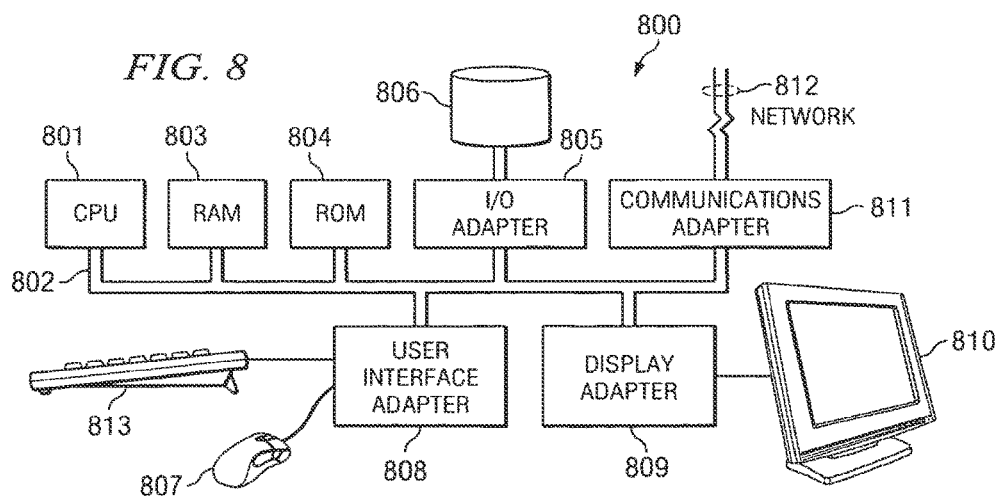

SELECTIVELY PORTING MEETING OBJECTS

CROSS-REFERENCE TO RELATED APPLICATION

The present application is a divisional application of U.S. patent application Ser. No. 11/263,582, filed on Oct. 31, 2005, and is related to co-pending and commonly assigned U.S. patent application Ser. No. 10/854,762, entitled "SYSTEM AND METHOD FOR ARCHIVING COLLABORATIVE ELECTRONIC MEETINGS"; and concurrently filed, co-pending, and commonly assigned U.S. patent application Ser. No. 11/263,652 entitled "NETWORK CONFIGURATION WITH SMART EDGE SERVERS"; and U.S. patent application Ser. No. 11/263,074 entitled "VIRTUAL GROUP CONNECTIONS", the disclosures of which are hereby incorporated herein by reference.

TECHNICAL FIELD

The present invention relates, in general to electronic collaboration space, and more specifically, to selectively porting one or more meeting objects in an electronic meeting.

BACKGROUND OF THE INVENTION

The first Internet was a communications system funded and built by researchers for military use. This Internet, originally known as ARPANET, was embraced by the research and academic communities as a mechanism for scientists to share and collaborate with other scientists. This collaborative network quickly evolved into the information superhighway of commerce and communication. The Internet explosion was due, in part, to the development of the World Wide Web (WWW) and graphically-based Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Non-Internet videoconferencing, which has generally never been able to completely supplant teleconferencing as a viable means for reliable communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect, at least initially, across the Internet to share voice, video, and data in real time for meetings, presentations, training, or the like.

In such collaborative meeting environments, a virtual meeting room typically is made up of several meeting objects which are generally containers for presentation information, such as slides, video, audio, documents; computer applications, and the like, that are themselves contained within the container of the meeting room. These meeting objects are typically placed into a static arrangement on the actual electronic meeting interface. Therefore, chat objects may be set on the bottom right of each meeting interface screen, while slide or other main presentation objects are set on the left half of each meeting interface screen. Once the meeting begins, each of the meeting participants, both presenters and viewers, usually see the same static meeting interface with the presenters information loaded thereon.

In some circumstances, however, meeting participants may not see the same static meeting interface, or, at least, see it in the form that the meeting room creator intended. When creating the meeting canvas or interface, the electronic meeting system presupposes a certain minimum display size. Thus meeting objects are designed with certain size parameters and the whole meeting canvas is designed to fit into a certain minimum size. As electronic meeting technology advances, it is becoming more possible for users at devices other than standard personal computers, whether desktop or laptop, to connect into the electronic meeting. These users may connect into the meeting using mobile phones, personal data assistants (PDAs), and the like. However, these devices usually have substantially limited display and processing capabilities. Therefore, an entire meeting canvas, designed for display on a standard computer display, will simply not fit on such a limited display in a meaningful and useful size. Instead of shrinking an entire standard-display sized meeting canvas down to the size of a mobile phone display, users accessing an electronic meeting using such limited capacity devices will usually only participate in the voice portion of the electronic meeting. Thus, these meeting participants will be unable to participate in much of the data collaboration that such electronic meetings are known for.

BRIEF SUMMARY OF THE INVENTION

The present invention is directed to a system and method for customizing electronic meeting broadcasts to the capabilities of the device of the participating user. A meeting server manages the electronic meeting including each of the participants' connections into the electronic collaboration space. As a part of the connection mechanism, the meeting server maintains information regarding the bandwidth and display capabilities of individual devices accessing the electronic meeting. Based on these capabilities and/or selections made by the meeting participant, the meeting server selectively identifies either none, if the device has no capabilities, or one or more meeting objects from a collection of meeting objects supporting the electronic meeting and transmits only those deleted meeting objects to the participant's device.

For example, a meeting participant using a mobile phone to connect into the electronic meeting may only receive the meeting object that lists the roster of participants. Therefore, in addition to the voice, connection that typically is managed over the regular telephone network, the user would be able to view the roster and any iconic information that the roster provides, such as an indicator of the current speaker, muted individuals, and the like. Facility would also be provided to the user of the mobile phone to see a list of available meeting objects that he or she could participate in. If the user would, therefore, desire to view another meeting object, a request initiated from the mobile phone to the meeting server would prompt the server to change the data stream supporting the roster object to the data stream supporting the desired meeting object. The participating user would then visualize the new meeting object of the mobile phone's display. Therefore, selective meeting pods could be transmitted to the user on the mobile phone while the mobile phone user otherwise participates in the electronic meeting.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 7 is a flowchart illustrating example steps executed in implementing one embodiment of the present invention; and FIG. 8 illustrates a computer em adapted to use embodiments of the present invention.

DETAILED DESCRIPTION OF THE INVENTION

Figure 1:
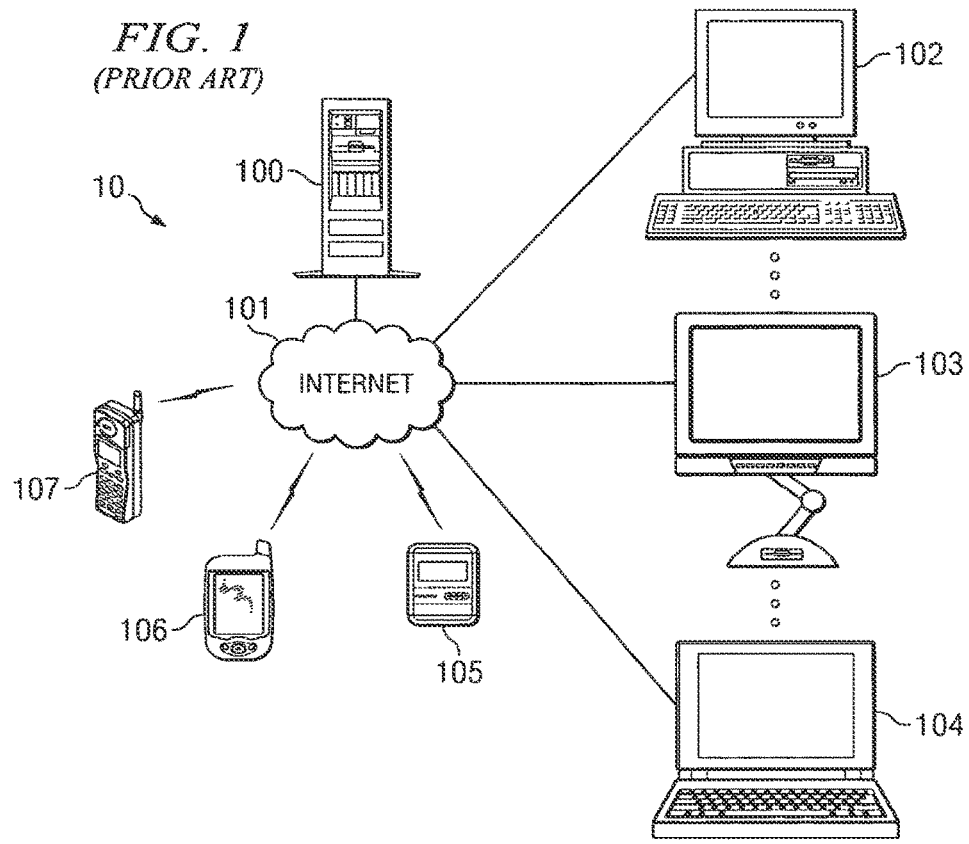
FIG. 1 is a block diagram illustrating one embodiment of typical electronic collaboration system.

FIG. 1 is a block diagram illustrating one embodiment of typical electronic collaboration system 10. Meeting server 100 hosts and manages the electronic meetings within electronic collaboration system 10. Meeting participants 102-107 each connect into electronic collaboration system 10 by accessing meeting server 100 through Internet 101. Meeting participants 102 and 103 will view the entire collection of meeting objects making up the electronic meeting space, as they have normal-sized displays capable of rendering the entire meeting canvas. Meeting participant 104 has a substantially reduced size display. Using current electronic meeting technology, meeting participant 104 will either view a scaled version of the entire meeting canvas, including all of the meeting objects in various states of reduction or diminished sizes, or participate only through a telephone connection (not shown). Meeting participants 105-107 will not be able to view any of the visual meeting content because their display sizes are incapable of showing a meaningful representation of the meeting canvas. These meeting participants would also only be able to participate in the electronic meeting using a normal telephone connection (not shown).

Figure 2:
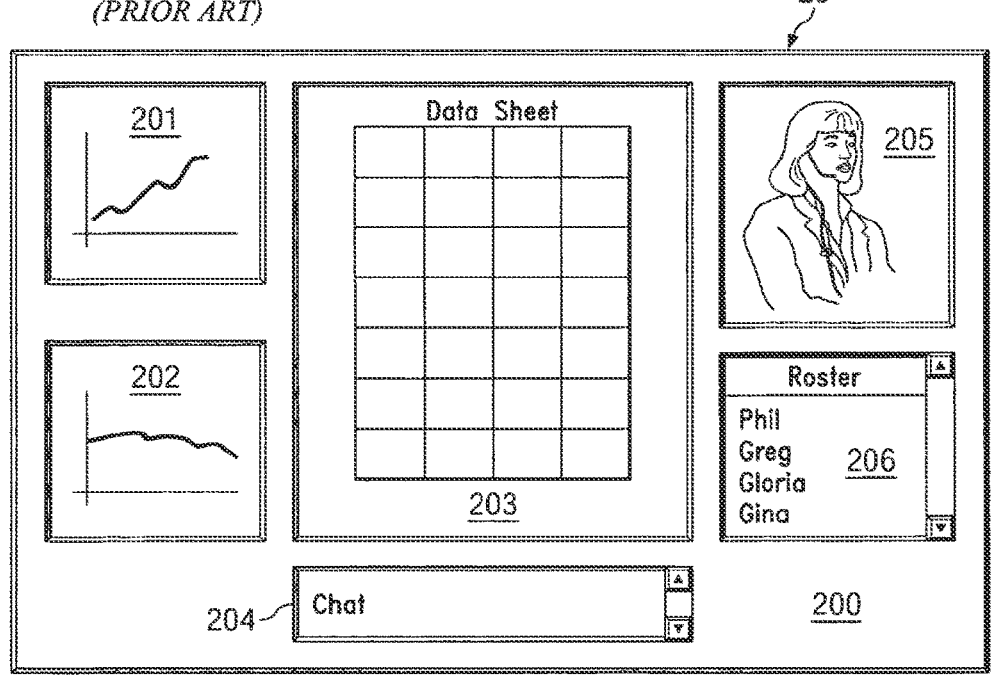
FIG. 2 is a screenshot illustrating a meeting canvas in one embodiment of typical electronic meeting.

FIG. 2 is a screenshot illustrating meeting canvas 200 in one embodiment of typical electronic meeting 20. Meeting canvas 200 contains multiple meeting pods or objects, each of which provide data or information related to electronic meeting 20. For example, meeting canvas 200 includes graph pods 201 and 202, screen share data sheet 203, chat pod 204, video object 205, and roster pod 206. In more advanced electronic meeting systems, such as MACROMEDIA, INC.'s BREEZE™, each of the meeting objects that make up a particular electronic meeting has a separate data stream that provides the data for the associated pod. BREEZE™ maintains a separate record and management of the individual data streams feeding the multiple meeting objects. The separate management and maintenance allows for an electronic meeting to be archived in detail, such that the various streams in the meeting archive may be reviewed and replayed separately. This archiving technology is described in commonly-assigned, co-pending, U.S. patent application Ser. No. 10/854,762, entitled, "SYSTEM AND METHOD FOR ARCHIVING COLLABORATIVE ELECTRONIC MEETINGS," the disclosure of which is incorporated herein.

In operation, the meeting server, such as meeting server 100 (FIG. 1), manages and maintains all of the connections by each of meeting participants 102-107 (FIG. 1). As each meeting participant accesses electronic meeting 20, handshake-type communication and information are exchanged between the meeting participant's device and meeting server 100 (FIG. 1). Meeting server 100, thus, maintains the identities of both the participating user and the participating user's device in electronic meeting 20. Meeting server 100 (FIG. 1) manages electronic meeting 20 by copying each of the data streams supporting meeting objects 201-206 to the meeting participants who are capable of viewing meeting canvas 200 (i.e., meeting participants 102-104). Meeting server 100 (FIG. 1) maintains connections to the other meeting participants as well, even though no copies of meeting canvas 200 are transmitted.

Figure 3A:
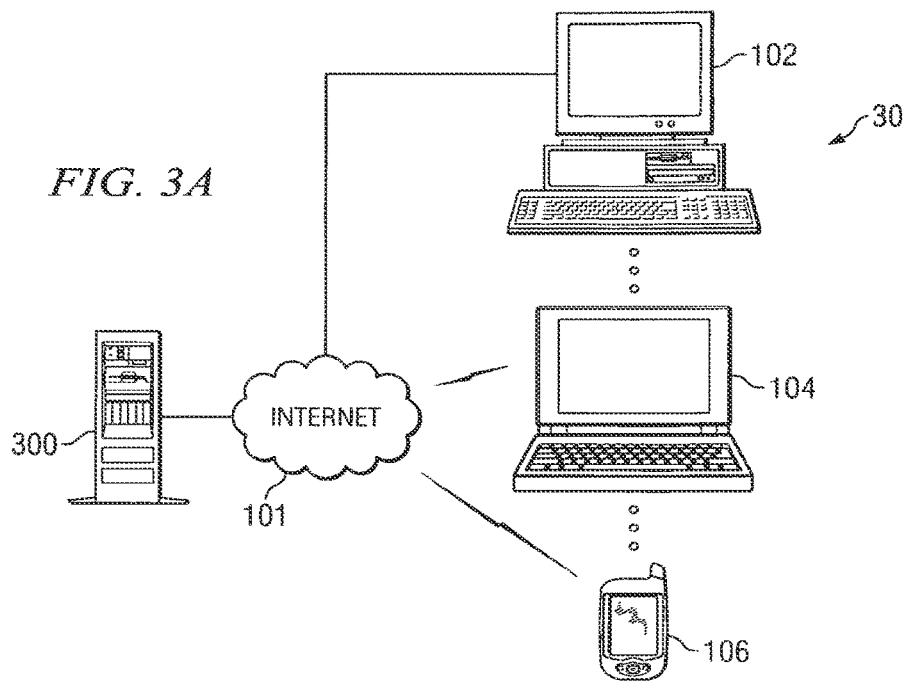
FIG. 3A is a block diagram illustrating an electronic collaboration system configured according to one embodiment of the present invention.

FIG. 3A is a block diagram illustrating electronic collaboration system 30 configured according to one embodiment of the present invention. Meeting server 300 hosts and manages the on-going electronic meeting between meeting participants 102, 104, and 106 through Internet 101. In setting up the electronic meeting, meeting participants 102, 104, and 106 access meeting server 300, exchanging identification data for both the participating user and the user's device. Part of the information exchanged with regard to the participant's device is the device capability. Thus, meeting participant 102 registers its device with meeting server 300 including a notation or information representing the full capabilities of a full-size personal computer.

Similarly, meeting participant 104 registers its device with meeting server 300 including a notation or information representing a diminished personal computer capacity. Meeting participant 104's device is a portable, sub-notebook with a very small display size. Meeting participant 104 is also connected to Internet 101 wirelessly. Therefore, in the registration process with meeting server 300, data is exchanged reflecting the quality of the wireless link, the data exchange rate, the network latency, and the like. Meeting participant 106 registers its device with meeting server 300 including a notation or information that the device is a mobile phone with a standard mobile display.

In establishing the connections to the electronic meeting, meeting server 300 not only maintains and manages all of the connections, but also, prior to transmitting the meeting information and data streams in support of the electronic meeting canvas, determines which data streams, and therefore, which meeting objects are to be transmitted to each meeting participant. In the case of a meeting participant who has a fully capable device, such as meeting participant 102, meeting server 300 transmits a standard electronic meeting package, which includes the full array of data streams supporting each of the meeting objects on the entire meeting canvas. For any accessing meeting participant who has a device that is any less than fully-capable, meeting server 300 determines a reduced set of data streams supporting a reduced set of meeting objects being transmitted to the meeting participant.

For example, meeting server 300 determines that the display and bandwidth capabilities of meeting participant 104 warrants transmitting only approximately 60% of the meeting canvas. Referring to meeting canvas 200 (FIG. 2), meeting server 300 determines to send only meeting objects 201, 202, 204, and 206 (FIG. 2) to meeting participant 104. In contrast, meeting server 300 determines that the display and bandwidth capabilities of meeting participant 106 warrants transmitting only a single meeting object, such as roster pod meeting object 206.

It should be noted that various alternative embodiments of the present invention may use various determiners for deciding which meeting objects to transmit to a less-capable accessing device. For example, a particular electronic collaboration system may prioritize various meeting object types, which provides a preference list for the different objects. A roster pod, the object that shows who is logged onto the electronic meeting, may be considered the most important and/or useful object to initially transmit. A chat or message object may be given a high priority as well. The various embodiments of the present invention are not limited to any particular meeting object prioritization or set of determiners.

Figure 3B:
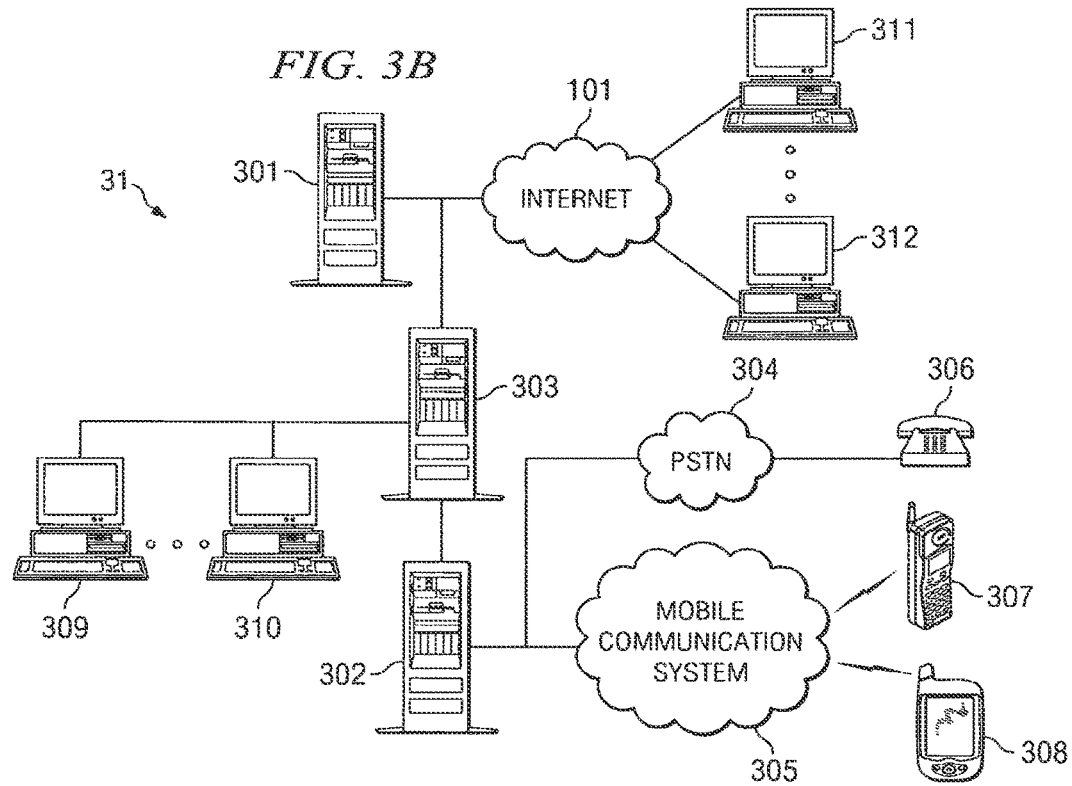
FIG. 3B is a block diagram illustrating an electronic collaboration system configured according to another embodiment of the present invention.

FIG. 3B is a block diagram illustrating electronic collaboration system 31 configured according to another embodiment of the present invention. Electronic collaboration system 30 (FIG. 3A) is configured according to one architecture of electronic meeting systems. Electronic collaboration system 31 has been configured according to another architecture as described in commonly-assigned, co-pending, U.S. patent application Ser. No. 11/263,652, now U.S. Pat No. 8,161,159, entitled, "NETWORK CONFIGURATION WITH SMART EDGE SERVERS," the disclosure of which is incorporated herein by reference. Meeting server 301 hosts and manages an on-going electronic meeting, much as done by meeting server 300 (FIG. 3A).

Meeting participants 311 and 312 connect into the meeting directly to meeting server 301 through Internet 101. Electronic collaboration system 31 also includes collaboration edge server 303, which provides a single connection into meeting server 301 despite connecting any available number of meeting participants into the electronic meeting managed by meeting server 301. This connection is implemented according to technology described in commonly-assigned, co-pending, U.S. patent application Ser. No. 11/263,074, entitled, "VIRTUAL GROUP CONNECTIONS," the disclosure of which is incorporated herein by reference. Meeting participants 309 and 310 connect into the electronic meeting through collaboration edge server 303.

Meeting proxy/gateway 302 is connected to collaboration edge server 303. Meeting proxy/gateway 302 is configured to receive all of the data and information being exchanged and transmitted as a part of the electronic meeting managed by meeting server 301. In addition to this capability, meeting proxy/gateway 302 is configured to receive parameters from connected meeting participants, such as meeting participants 306-308, through Publicly Switched Telephone Network (PSTN) 304 and mobile communication system 305. These parameters include display and bandwidth capabilities of meeting participants 306-308. Such display and bandwidth capabilities for meeting participants 306-308 warrant transmitting only a portion of the meeting canvas or one or more of the meeting objects selected by the specific meeting participant.

It should be noted that in the embodiment illustrated in FIG. 3B, meeting server 301 may have no capabilities for dividing the data streams that support each individual meeting object. However, by inserting meeting proxy/gateway 302 into electronic collaboration system 31, the ability to selectively transmit a particular meeting pod or meeting object to a client or meeting participant device is implemented.

Figure 4A:
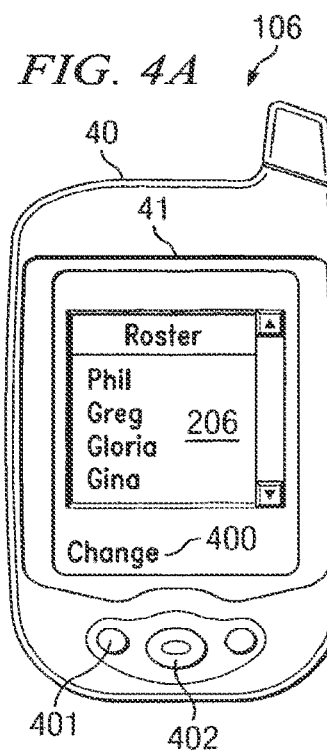
FIG. 4A is a diagram illustrating a mobile phone of a meeting participant as connected to the electronic meeting maintained by the meeting server (FIG. 3A) configured according to one embodiment of the present invention.

FIG. 4A is a diagram illustrating mobile phone 40 of meeting participant 106 as connected to the electronic meeting maintained by meeting server 300 (FIG. 3A) configured according to one embodiment of the present invention. As meeting server 300 (FIG. 3A) initializes meeting participant 106's participation in the electronic meeting, it transmits the data stream supporting roster pod meeting object 206 for presentation on mobile display 41. In the described embodiment, facility is given to meeting participant 106 to request a change in the viewed meeting object. Change selector 400, presented on mobile display 41, allows the user to contact meeting server 300 (FIG. 3A) by actuating soft key 401. In activating change selector 400, mobile phone 40 requests meeting server 300 (FIG. 3A) to change the meeting object being transmitted to mobile phone 40. In the described embodiment, meeting server 300 (FIG. 3A) transmits the name of each available meeting object for display on mobile display 41. Using a directional button, such as 5-way button 402, the user may scroll through the list of meeting objects to select the specific meeting object to receive. Meeting server 300 (FIG. 3A) would, thereafter, transmit the data stream supporting the meeting object selected by meeting participant 106.

Figure 4B:
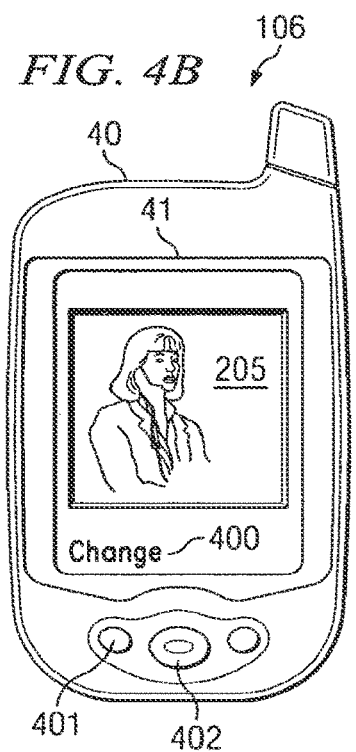
FIG. 4B is a diagram illustrating a mobile phone of a meeting participant connected to an electronic collaboration system configured according to one embodiment of the present invention.

FIG. 4B is a diagram illustrating mobile phone 40 of meeting participant 106 connected to an electronic collaboration system configured according to one embodiment of the present invention. When meeting participant 106 requests meeting server 300 (FIG. 3A) to change meeting objects, meeting server 300 (FIG. 3A) transmits the data stream supporting video meeting object 205 to mobile phone 40. Video meeting object 205 is then displayed onto mobile display 41. Meeting participant 106 may then view the video being displayed on video meeting object 205 until he or she desires to change the viewed object using change selector 400, soft key 401, and 5-way button 402 or exit the electronic meeting.

Figure 4C:
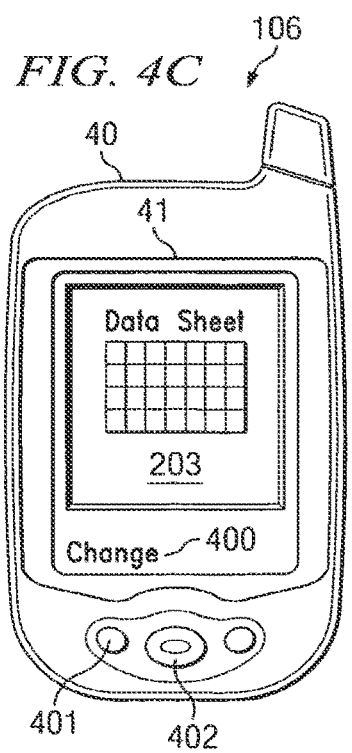
FIG. 4C is a diagram illustrating a mobile phone of a meeting participant connected to an electronic collaboration system configured according to one embodiment of the present invention.

FIG. 4C is a diagram illustrating mobile phone 40 of meeting participant 105 connected to an electronic collaboration system configured according to one embodiment of the present invention. As meeting participant 106 requests another meeting object change from meeting server 300 (FIG. 3A), meeting server 300 transmits the data earn supporting screen share data sheet object 203 to mobile phone 40. Thus, meeting participant 106 may view the electronic data being shared or collaborated in the electronic meeting even though he or she is accessing the electronic meeting using a very low capability device. Moreover, by providing change selector 400, facility is given by the electronic collaboration system to meeting participant 106 to switch to and from the various different meeting objects making up the meeting canvas of the electronic meeting.

Figure 5:
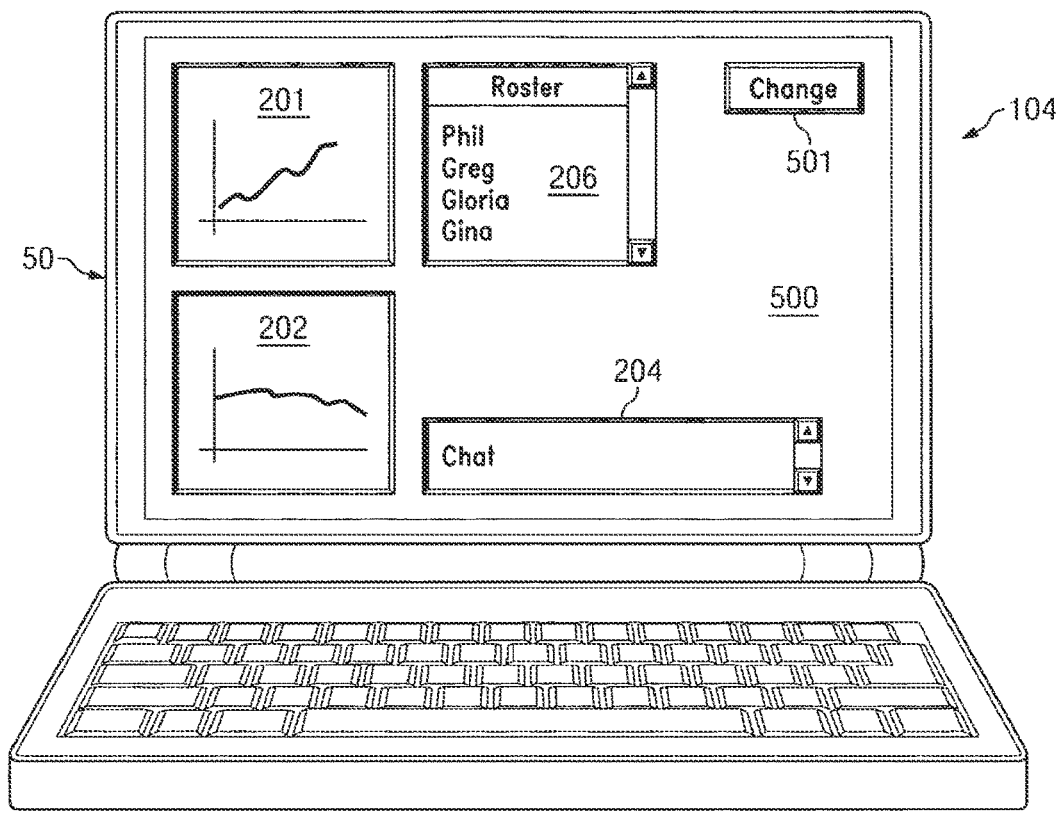
FIG. 5 is a diagram illustrating a sub-notebook of a meeting participant connected to a collaboration meeting system configured according to one embodiment of the present invention.

FIG. 5 is a diagram illustrating sub-notebook 50 of meeting participant 104 connected to a collaboration meeting system configured according to one embodiment of the present invention. As meeting server 300 (FIG. 3A) initializes meeting participant 104's participation in the electronic meeting, it transmits the data streams supporting graph pod meeting objects 201 and 202, chat pod meeting object 204, and roster pod meeting object 206 for presentation on display 500. In the described embodiment, facility is also given to meeting participant 104 for requesting a change in the collection of viewed meeting objects. Change button 501, presented on display 500, allows the user to contact meeting server 300 (FIG. 3A) to request a change in the group of meeting objects being transmitted to sub-notebook 50. Meeting server 300 (FIG. 3A) transmits the name of each available meeting object for display on display 500. Meeting participant 104 may then use a mouse or other type of pointing device to select the specific meeting objects to receive. Meeting server 300 (FIG. 3A) would, thereafter, transmit the data streams supporting the selected meeting objects.

Figure 6:
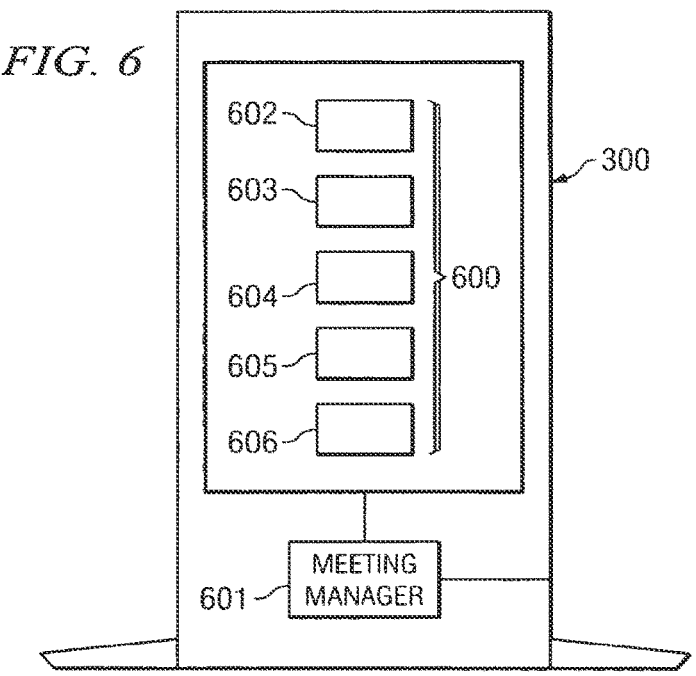
FIG. 6 is a block diagram illustrating a meeting server configured according to one embodiment of the present invention.

FIG. 6 is a block diagram illustrating meeting server 300 configured according to one embodiment of the present invention. One of the features of meeting server 300 is meeting manager 601. Meeting manager 601 monitors the relevant information for each of the participating users to determine what parts of on-going electronic meeting 600 to deliver to each individual meeting participant. Electronic meeting 600, as contained on meeting server 300, includes data streams 602-606 supporting each of the meeting objects in the entire electronic meeting canvas. Depending on which meeting participant is being considered by meeting server 300, meeting manager 601 will select none or one or more of data streams 602-606 to transmit to the meeting participant. In circumstances where a meeting participant is accessing the meeting only using a normal telephone connection (i.e., a telephone connection without any kind of display capability), meeting server 300 and meeting manager 601 will not transmit any of data streams 602-606, but merely manage the simple connection of that meeting participant.

FIG. 7 is a flowchart illustrating example steps executed in implementing one embodiment of the present invention. In step 700, an electronic meeting is started having a plurality of meeting objects supported by a plurality of data streams. Information is received, in step 701, from a meeting participant device regarding a set of device capabilities, such as bandwidth, network latency, display size, display resolution, user interface, and the like. In step 702, the data streams are prioritized according to a predetermined set of determiners. Responsive to the device capabilities, the data streams are selected, if any, according to the prioritization in step 703. In step 704, the selected data streams are transmitted to the meeting participant device. The meeting objects are displayed on the meeting participant device, in step 705, using any of the transmitted data streams. In step 706, a request is received from the meeting participant device, initiated by a user, to change one or more data streams. A list of the available meeting objects is provided to the meeting participant device in step 707. A selection signal is received from the meeting participant device in step 708. In step 709, one or more data streams are transmitted responsive to the selection signal.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

FIG. 8 illustrates computer system 800 adapted to use embodiments of the present invention, e.g. storing and/or executing software associated with the embodiments. Central processing unit (CPU) 801 is coupled to system bus 802. The CPU 801 may be any general purpose CPU. However, embodiments of the present invention are not restricted by the architecture of CPU 801 as long as CPU 801 supports the inventive operations as described herein. Bus 802 is coupled to random access memory (RAM) 803, which may be SRAM, DRAM, or SDRAM. ROM 804 is also coupled to bus 802, which may be PROM, EPROM, or EEPROM. RAM 803 and ROM 804 hold user and system data and programs as is well known in the art.

Bus 802 is also coupled to input/output (I/O) controller card 805, communications adapter card 811, user interface card 808, and display card 809. The I/O adapter card 805 connects storage devices 806, such as one or more of a hard drive, a CD drive, a floppy disk drive, a tape drive, to computer system 800. The I/O adapter 805 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 811 is adapted to couple the computer system 800 to a network 812, which may be one or more of a telephone network, a local (LAN) and/or a wide-area (WAN) network, an Ethernet network, and/or the Internet network. User interface card 808 couples user input devices, such as keyboard 813, pointing device 807, and the like, to the computer system 800. The display card 809 is driven by CPU 801 to control the display on display device 810.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for real-time meeting collaboration, the method comprising:
    initiating a collaborative meeting comprising a plurality of meeting objects that are containers that present information from separate data streams, the meeting objects comprising a first meeting object that presents a roster of participants in a meeting, a second meeting object that presents a video from the meeting, and a third meeting object that allows messaging within the meeting;
    receiving device display and bandwidth capabilities from a device participating in the collaborative meeting, wherein the device display and bandwidth capabilities comprise one or more of (i) a bandwidth capability, (ii) a network latency, (iii) a display size, and (iv) a display resolution;
    selecting, by a processor and from the meeting objects, a reduced set of the meeting objects based on an application of the received display and bandwidth capabilities of the device and priorities for the meeting objects, wherein the reduced set of the meeting objects are supported by a reduced set of the separate data streams, each of the reduced set of the meeting objects presenting different information about the meeting based on a respective separate data stream;
    transmitting the reduced set of data streams to the device, wherein the device displays the reduced set of the meeting objects on a display using the reduced set of data streams and the meeting objects further comprise a fourth meeting object that presents, on the display, data shared by another device participating in the meeting;
    responsive to receiving, from the device, a request to change one or more of the reduced set of data streams, providing, to the device, a list of the plurality of the meeting objects;
    receiving, from the device, a selection of a changed set of the meeting objects from the plurality of meeting objects, the changed set of the meeting objects supported by a changed set of the separate data streams; and
    transmitting the changed set of data streams to the device in real time, wherein transmitting the changed set of data streams to the device in real time causes the device to switch the display from the reduced set of the meeting objects to the changed set of the meeting objects in real time.

2. The method of claim 1 further comprising maintaining separate records for each of the separate data streams in a meeting archive, where in each of the separate records can be replayed individually.

3. The method of claim 1, wherein the device display and bandwidth capabilities are received from the device via a proxy gateway.

4. A non-transitory computer readable storage medium storing computer-executable program instructions, wherein when executed by a processing unit, cause the processing unit to perform operations comprising:
    initiating a collaborative meeting comprising a plurality of meeting objects that are containers that present information from separate data streams, the meeting objects comprising a first meeting object that presents a roster of participants in a meeting, a second meeting object that presents a video from the meeting, and a third meeting object that allows messaging within the meeting;
    receiving display and bandwidth capabilities from a device participating in the collaborative meeting, wherein the display and bandwidth capabilities comprise one or more of (i) a bandwidth capability, (ii) a network latency, (iii) a display size, and (iv) a display resolution;
    selecting, from the meeting objects, a reduced set of the meeting objects based on an application of the received display and bandwidth capabilities of the device and priorities for the meeting objects, wherein the reduced set of the meeting objects are supported by a reduced set of the separate data streams, each of the reduced set of the meeting objects presenting different information about the meeting based on a respective separate data stream;
    transmitting the reduced set of data streams to the device, wherein the device displays the reduced set of the meeting objects on a display using the reduced set of data streams and the meeting objects further comprise a fourth meeting object for that presents, on the display, data shared by another device participating in the meeting;
    responsive to receiving, from the device, a request to change one or more of the reduced set of data streams, providing, to the device, a list of the plurality of the meeting objects;
    receiving, from the device, a selection of a changed set of the meeting objects from the plurality of the meeting objects, the changed set of the meeting objects supported by a changed set of the separate data streams; and
    transmitting the changed set of data streams to the device in real wherein transmitting the changed set of data streams to the device in real time causes the device to switch the display from the reduced set of the meeting objects to the changed set of the meeting objects in real time.

5. The non-transitory computer readable storage medium of claim 4, the operations further comprising maintaining separate records for each of the separate data streams in a meeting archive, where in each of the separate records can be replayed individually.

6. The non-transitory computer readable storage medium of claim 4, wherein the display and bandwidth capabilities are received from the device via a proxy gateway.

7. A system comprising:
a processor configured with process instructions stored on a computer readable medium to:
initiate a collaborative meeting comprising a plurality of meeting objects that are containers that present information from separate data streams, the meeting objects comprising a first object that present a roster of participants in a meeting, a second object that present a video from the meeting, and a third object that allows for messaging within the meeting;
receive device display and bandwidth capabilities from a device participating in the collaborative meeting, wherein the device display and bandwidth capabilities comprise one or more of (i) a bandwidth capability, (ii) a network latency, (iii) a display size, and (iv) a display resolution;
select, from the meeting objects, a reduced set of the meeting objects based on an application of the received display and bandwidth capabilities of the device and priorities for the meeting objects, wherein the reduced set of the meeting objects are supported by a reduced set of the separate data streams, each of the reduced set of the meeting objects presenting different information about the meeting based on a respective separate data stream;
transmit the reduced set of data streams to the device, wherein the device displays the reduced set of the meeting objects on a display using the reduced set of data streams and the meeting objects further comprise a fourth meeting object for that presents, on the display, data shared by another device participating in the meeting;
responsive to receiving, from the device, a request to change one or more of the reduced set of data streams, provide, to the device, a list of the plurality of the meeting objects;
receive, from the device, a selection of a changed set of the meeting objects from the plurality of the meeting objects, the changed set of the meeting objects supported by a changed set of the separate data streams; and
transmit the changed set of data streams to the device in real time wherein transmitting the changed set of data streams to the device in real time causes the device to switch the display the reduced set of the meeting objects to the changed set of the meeting objects in real time.

8. The system of claim 7, wherein the processor is further configured to maintain separate records for each of the separate data streams in a meeting archive, where in each of the separate records can be replayed individually.

9. The system of claim 7, wherein the display and bandwidth capabilities comprise one or more of: bandwidth, network latency, display size, display resolution, and user interface.

10. The system of claim 7, wherein the meeting objects further comprise a fourth object for presenting data shared by another device participating in the meeting.

11. The system of claim 7, wherein the device display and bandwidth capabilities are received from the device via a proxy gateway.

* * * * *